(12) United States Patent
Haut et al.

(10) Patent No.: US 9,193,372 B2
(45) Date of Patent: Nov. 24, 2015

(54) INFANT STROLLER APPARATUS

(75) Inventors: Robert E. Haut, West Chester, PA (US); Andrew J. Winterhalter, West Lawn, PA (US); Curtis M. Hartenstine, Birdsboro, PA (US); Joseph F. Fiore, Jr., Lebanon, PA (US); Linhai Shan, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 738 days.

(21) Appl. No.: 13/274,457

(22) Filed: Oct. 17, 2011

(65) Prior Publication Data

US 2012/0098219 A1    Apr. 26, 2012

Related U.S. Application Data

(60) Provisional application No. 61/455,565, filed on Oct. 21, 2010.

(30) Foreign Application Priority Data

Sep. 30, 2011    (CN) .......................... 2011 1 0291620

(51) Int. Cl.
*B62B 9/00* (2006.01)
*B62B 7/08* (2006.01)
(Continued)

(52) U.S. Cl.
CPC . *B62B 7/08* (2013.01); *B62B 7/008* (2013.01); *B62B 7/14* (2013.01); *B62B 9/102* (2013.01); *B62B 9/104* (2013.01); *B62B 5/087* (2013.01); *B62B 7/123* (2013.01)

(58) Field of Classification Search
CPC .......... B62B 7/044; B62B 7/04; B62B 7/008; B62B 7/06; B62B 7/08; B62B 7/10; B62B 7/00; B62B 7/14; B62B 9/02; B62B 9/12; B62B 9/104; B62B 2202/404; B62B 2205/02; B62B 9/102; B62B 7/123; B62B 5/087; A61G 5/08
USPC ............ 280/47.38, 42, 647, 650, 47.4, 47.41, 280/658
See application file for complete search history.

(56) References Cited

U.S. PATENT DOCUMENTS 1,372,538 A * 3/1921 Olson ........................ 280/47.35
1,569,985 A    1/1926 Kuniholm
(Continued)

FOREIGN PATENT DOCUMENTS

CN    2188062 Y    1/1995
CN    2415682 Y    1/2001
(Continued)

OTHER PUBLICATIONS

European search report from co-pending European application number EP11185995.5 filed Oct. 20, 2011 EP publication number EP2444296 published Apr. 25, 2012 (Wonderland Nurserygoods Hong Kong Company Limited).

*Primary Examiner* — Paul N Dickson
*Assistant Examiner* — Bridget Avery
(74) *Attorney, Agent, or Firm* — David I. Roche; Baker & McKenzie LLP (57) ABSTRACT

A stroller apparatus comprises a support frame, a first seat assembled with the support frame and configured to receive a child in a first position, a second seat assembled with the support frame and configured to receive the child in a second position at a height different from the first position, the child facing rearward when seated on either of the first and second seats, and a third seat assembled with the support frame and configured to receive a second child in a third position facing forward in front of the first and second seats.

23 Claims, 11 Drawing Sheets

(51) Int. Cl.
  *B62B 7/00*    (2006.01)
  *B62B 7/14*    (2006.01)
  *B62B 9/10*    (2006.01)
  *B62B 5/08*     (2006.01)
  *B62B 7/12*     (2006.01)

(56) References Cited

U.S. PATENT DOCUMENTS

| | | | |
|---|---|---|---|
| 2,993,702 A * | 7/1961 | Gill | 280/643 |
| 3,042,032 A * | 7/1962 | Vogel | 128/882 |
| 3,223,431 A | 12/1965 | Gottfried et al. | |
| 4,805,935 A | 2/1989 | Grayson | |
| 4,834,415 A * | 5/1989 | Yee | 280/644 |
| 4,969,656 A | 11/1990 | Clausen | |
| 5,338,096 A * | 8/1994 | Huang | 297/243 |
| 5,417,449 A * | 5/1995 | Shamie | 280/642 |
| 5,664,795 A | 9/1997 | Haung | |
| 5,918,891 A * | 7/1999 | Russell | 280/33.991 |
| 6,045,145 A * | 4/2000 | Lan | 280/47.38 |
| 6,086,087 A * | 7/2000 | Yang | 280/658 |
| 6,250,653 B1 * | 6/2001 | Worrell | 280/47.38 |
| 6,267,406 B1 * | 7/2001 | Huang | 280/647 |
| 6,585,284 B2 * | 7/2003 | Sweeney et al. | 280/650 |
| 6,676,140 B1 * | 1/2004 | Gondobintoro | 280/33.993 |
| 6,935,652 B2 * | 8/2005 | Fair et al. | 280/642 |
| 8,157,273 B2 * | 4/2012 | Bar-Lev | 280/47.39 |
| 8,282,119 B1 * | 10/2012 | Caksa | 280/642 |
| 2007/0001429 A1 * | 1/2007 | Maciejczyk | 280/642 |
| 2007/0108710 A1 * | 5/2007 | Pennisi et al. | 280/47.38 |
| 2010/0078916 A1 | 4/2010 | Chen | |
| 2010/0140902 A1 * | 6/2010 | Zehfuss | 280/650 |
| 2010/0244393 A1 * | 9/2010 | Thomas et al. | 280/33.993 |
| 2010/0282800 A1 * | 11/2010 | Li et al. | 224/409 |
| 2011/0025022 A1 * | 2/2011 | Li | 280/647 |

FOREIGN PATENT DOCUMENTS

| | | | | |
|---|---|---|---|---|
| CN | 201065133 Y | | 5/2008 | |
| DE | 9202264 U1 | | 6/1992 | |
| DE | 4202428 A1 | | 8/1992 | |
| DE | 4337917 A1 * | | 5/1994 | B62B 3/00 |
| DE | 20018120 U1 | | 4/2001 | |
| DE | 202009000172 U1 | | 5/2009 | |
| DE | 202009005213 U1 | | 1/2010 | |
| GB | 2462728 A | | 2/2010 | |
| GB | 2463982 A * | | 4/2010 | B62B 7/14 |
| WO | WO 2013189720 | * | 12/2013 | B62B 7/00 |

* cited by examiner

INFANT STROLLER APPARATUS

CROSS-REFERENCE TO RELATED APPLICATIONS

This application claims priority to U.S. Provisional Patent Application No. 61/455,565, which was filed on Oct. 21, 2010, and China Patent Application No. 201110291620.1, which was filed on Sep. 30, 2011.

BACKGROUND OF THE INVENTION

1. Field of the Invention

The present invention relates to stroller apparatuses that can receive multiple children.

2. Description of the Related Art

A current trend is to provide a stroller apparatus that can receive a child close to the caregiver. To this end, some approaches propose a stroller apparatus in which the child can be seated facing rearward. Other approaches may also propose a stroller apparatus that can detachably receive a portable infant car seat. However, a disadvantage of the current designs is that the stroller cannot be folded with the detachable seat thereon. Moreover, stroller apparatuses designed to receive the portable infant car seat may not be able to seat a child of older age.

Therefore, there is a need for a stroller apparatus that can be more versatile in use and address at least the foregoing issues.

SUMMARY

The present application describes a stroller apparatus that can seat one or more children in different positions. In one embodiment, the stroller apparatus comprises a support frame, a first seat assembled with the support frame and configured to receive a child in a first position, a second seat assembled with the support frame and configured to receive the child in a second position at a height different from the first position, the child facing rearward when seated on either of the first and second seats, and a third seat assembled with the support frame and configured to receive a second child in a third position facing forward in front of the first and second seats.

In other embodiments, the stroller apparatus comprises front and rear legs, a side handrail respectively connected pivotally with the front and rear legs, a handle pivotally connected with the side handrail, and a seat support frame located below the side handrail and pivotally connected with the front leg and the handle. The side handrail is configured to detachably assemble with a first seat, and the seat support frame is configured to detachably assemble with a second seat below the first seat, either of the first and second seats when installed being substantially adjacent to the handle and facing rearward.

In yet other embodiments, the stroller apparatus comprises front and rear legs, a side handrail pivotally connected with the front and rear legs, a handle pivotally connected with the side handrail, and a first seat mounted on the side handrail, the first seat including a lateral extension and a link bracket pivotally connected with the lateral extension, the link bracket being configured to detachably assemble with the handle when the first seat is installed on the side handrail.

DETAILED DESCRIPTION OF THE EMBODIMENTS

Figure 1:
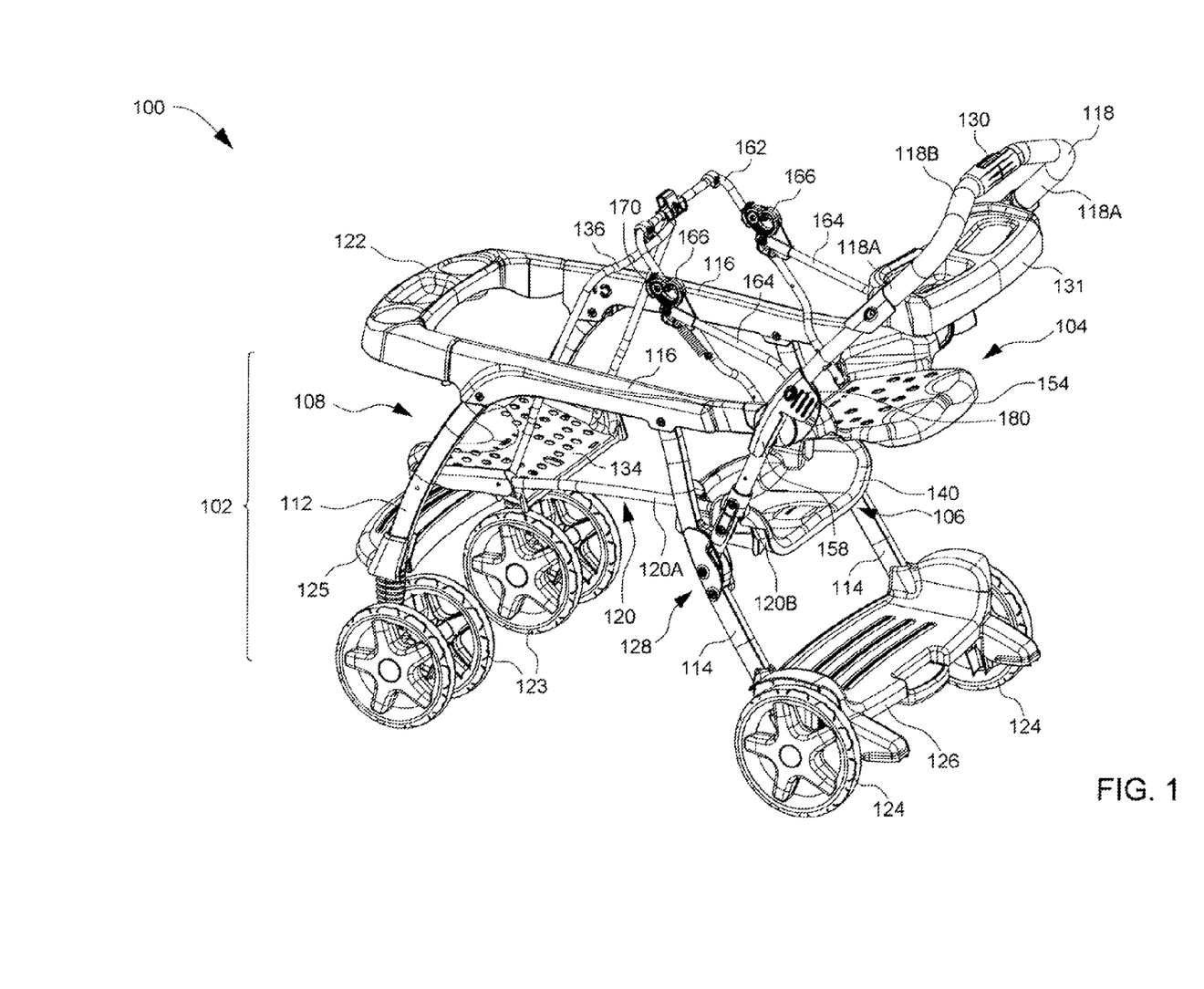
FIG. 1 is a schematic view illustrating one embodiment of a stroller apparatus.

FIG. 1 is a schematic view illustrating one embodiment of a stroller apparatus 100. The stroller apparatus 100 can include a support frame 102, and a plurality of seats adapted to receive one or more child in different positions. The seats can include a first seat 104 adapted to receive a child in a first position facing rearward, a second seat 106 adapted to receive a child in a second position facing rearward at a height different from the height of the first seat 104, and a third seat 108 adapted to receive a child in a third position facing forward in front of the first and second seats 104 and 106. In some embodiments, the stroller apparatus 100 can be used as a tandem stroller that accommodates two children. A first child may be placed on the third seat 108 facing forward. A second child may be placed on either of the first and second seats 104 and 106 facing rearward behind the first child. The first seat 104 can be used to seat a younger child at a higher position close to the caregiver when the stroller apparatus 100 is in displacement. The second seat 106 can be used to seat an older child at a lower position below the first seat 104. Both the first and second seats 104 and 106 can be designed to detachably assemble with the support frame 102. For example, the first seat 104 can be removed when the second seat 106 is used to seat a child. The second seat 106 may also be removed when unused.

The support frame 102 can have left and right sides symmetric in construction, including front legs 112, rear legs 114, side handrails 116, a handle 118 and a seat support frame 120. At each of the left and right sides of the support frame 102, the side handrail 116 extends from a front to a rear of the stroller apparatus 100. Front ends of the side handrails 116 can be connected with left and right side ends of a front table 122 that is placed along a transverse direction in front of the third seat 108. The front leg 112 can have an upper end pivotally connected with a front portion of the associated side handrail 116, and the rear leg 114 can have an upper end pivotally connected with a rear portion of the associated side handrail 116. Lower ends of the front and rear legs 112 and 114 can be respectively mounted with front and rear wheels 123 and 124 for displacement of the stroller apparatus 100.

In some embodiments, a footrest 125 can be connected between the front legs 112 at a position below the third seat 108. In addition, a stand platform 126 can be assembled between the rear legs 114 in an area between the rear wheels 124. When a child is installed on the third seat 108, the footrest 125 can provide support for the child's feet. The stand platform 126 can be used as support for a child standing at the rear of the support frame 102, or for supporting the feet of a child sitting on the second seat 106. While standing on the stand platform 126, the child can also grasp the side handrails 116 or handle 118.

The handle 118 can have a generally U-shape including left and right side segments 118A, and a transverse segment 118B connected between the side segments 118A. Each of the side segments 118A can be pivotally connected with a rear portion of the associated side handrail 116. In some embodiments, a shaft portion 127 (better shown in FIGS. 6 and 7) can be passed through a hole formed through the rear portion of the side handrail 116 to form the pivotal connection between each side segment 118A of the handle 118 and the side handrail 116. Each of the side segments 118A can also have a distal end separably connected with the rear leg 114 via a joint structure 128. In some embodiments, each of the joint structures 128 can include a latch mechanism (not shown) that may be operatively connected with an actuator 130 provided on the transverse segment 118B of the handle 118. With this construction, the handle 118 can be operable to rotate relative to the rear legs 114 and the side handrails 116 when the stroller apparatus 100 is collapsed or deployed. For convenient disposal of diverse objects, a tray 131 may be affixed between the side segments 118A at an elevated height proximate to the transverse segment 118B of the handle 118.

In some embodiments, the seat support frame 120 can be placed below the side handrail 116 and include two elongated side bars 120A, and a transverse bar 120B connected with the rear ends of the side bars 120A. Each of the side bars 120A can have a front end pivotally connected with associated front leg 112, and a rear end pivotally connected with one associated side segment 118A of the handle 118 via a coupling link 132 (better shown in FIG. 2). The seat support frame 120 can be used to mount the second seat 106 and the third seat 108.

The third seat 108 can include a seat board 134 that is fixedly attached with the side bars 120A at a position adjacent to the front legs 112 and below the side handrails 116. The third seat 108 can also include a backrest frame 136 pivotally connected with the seat board 134. While the third seat 108 is permanently attached with the seat support frame 120 in the illustrated embodiment, some variant implementations can also have the third seat 108 detachably connected with the seat support frame 120.

Figure 2:
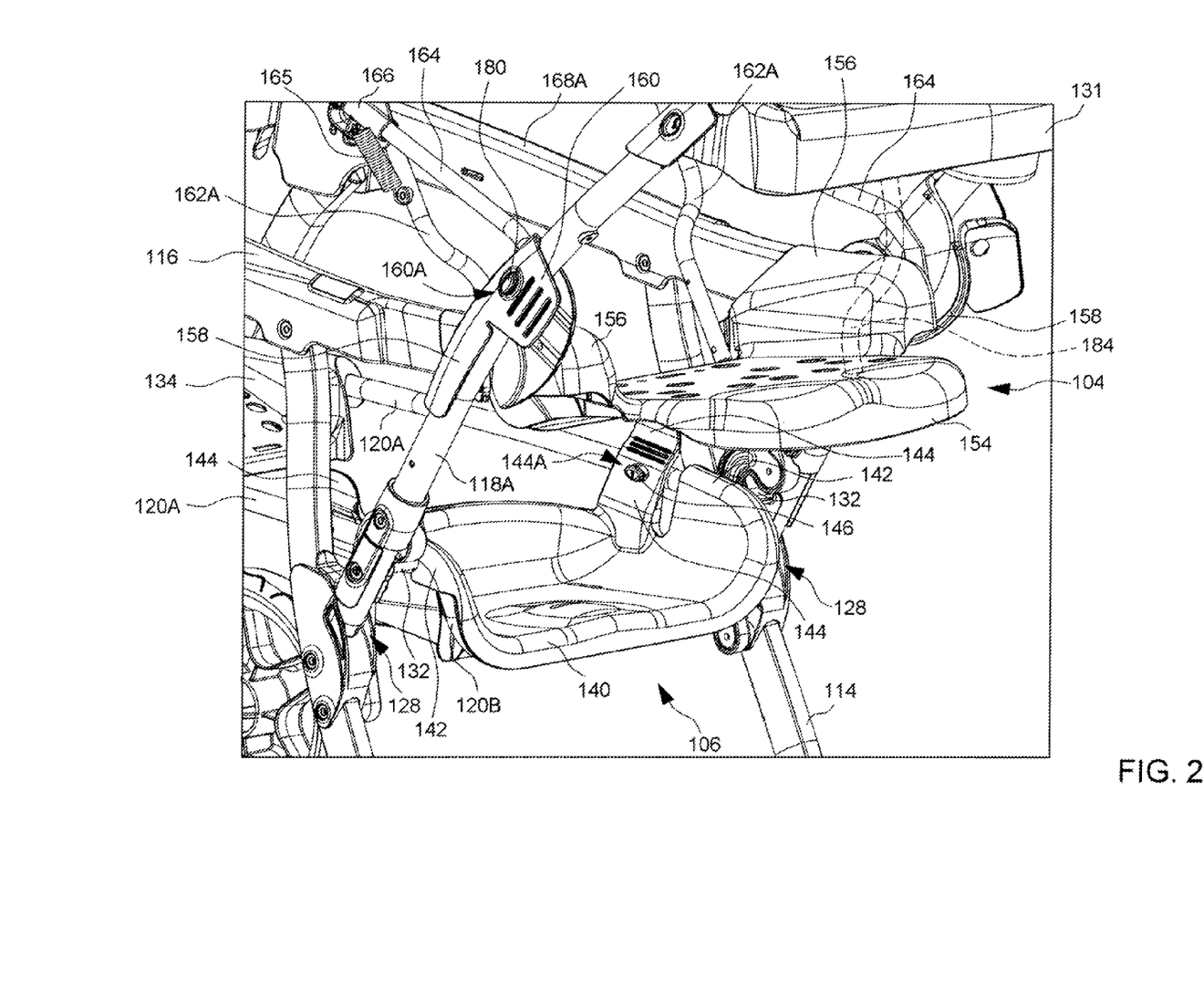
FIG. 2 is an enlarged view illustrating the assembly of a first and a second seat in the stroller apparatus shown in FIG. 1.

In conjunction with FIG. 1, FIG. 2 is an enlarged view illustrating the assembly of the first and second seats 104 and 106 with the support frame 102. The second seat 106 can be provided as a bench board 140 that is detachably assembled with a rear of the seat support frame 120 substantially adjacent to the handle 118. Various constructions may be implemented to detachably mount the second seat 106 with the seat support frame 120. For example, the bench board 140 can be formed with a shape having two lateral raised portions having catches 142, and two flex tongues 144 provided with openings 144A. The second seat 106 can be mounted with the seat support frame 120 with the side bars 120A grasped by the catches 142. Moreover, studs 146 protruding from the side bars 120A can respectively engage through the openings 144A of the flex tongues 144 to lock the bench board 140 in place. The bench board 140 can be thereby installed at a position proximate to the connection between the rear of the seat support frame 120 and the handle 118. To detach the second seat 106, the flex tongues 144 may be deflected to disengage the studs 146 from the openings 144A, after which the second seat 106 may be pulled up and removed.

It is worth noting that the aforementioned latch for locking the second seat 106 with the seat support frame 120 may be implemented with different constructions. For example, in alternate embodiments, the positions of the openings 144A and studs 146 may be interchanged, i.e., the studs are provided on the flex tongues 144 whereas the openings are respectively provided on the side bars 120A of the seat support frame 120.

Figure 3:
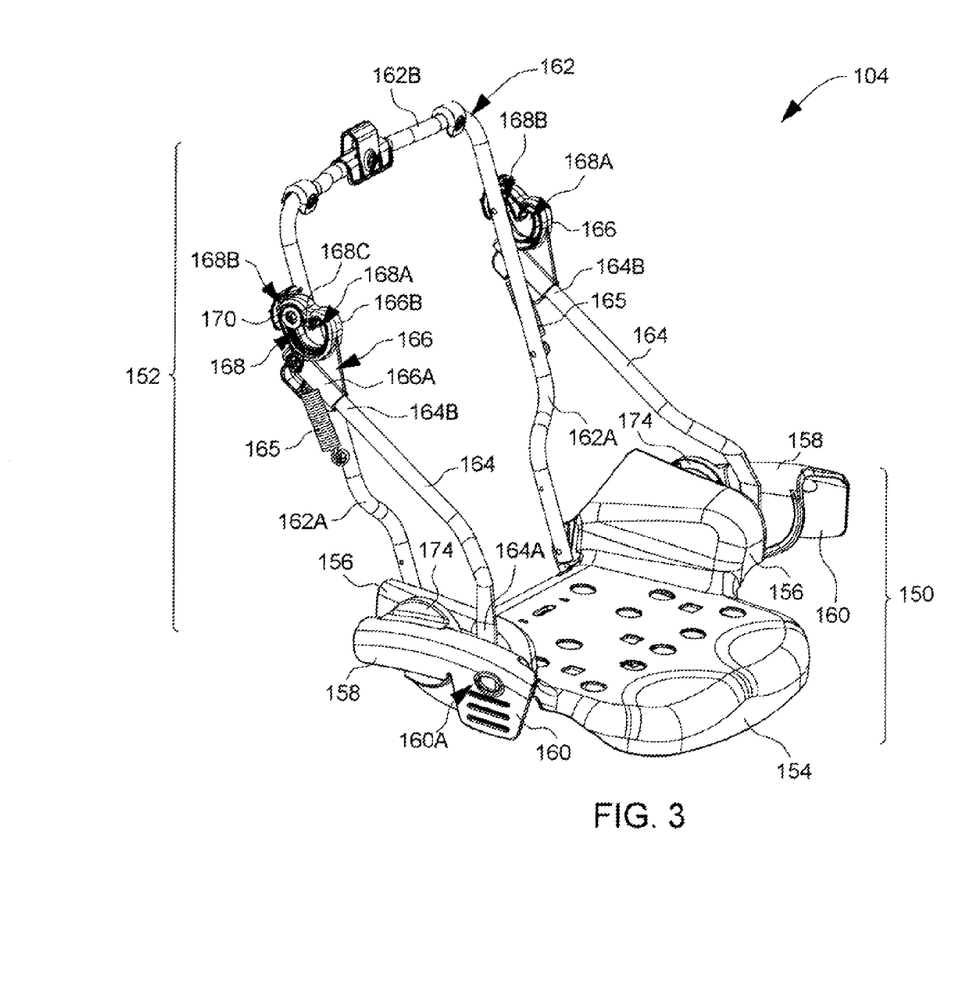
FIG. 3 is a perspective view detailing the construction of the first seat shown in FIG. 2.

In conjunction with FIG. 1, FIG. 3 is a perspective view illustrating the construction of the first seat 104. In one embodiment, the first seat 104 can include a seat portion 150, and a backrest assembly 152 connected with the seat portion 150. The seat portion 150 can include a seat board 154 having lateral extensions 156 at left and right sides, and two link brackets 158 respectively connected pivotally with the outer side surfaces of the lateral extensions 156. In one embodiment, each of the link brackets 158 can be formed as a sleeve having an elongated shape opened at an underside. An outer side surface of each link bracket 158 can form a flex extension 160 provided with an opening 160A. The link brackets 158 can rotate relative to the seat board 154.

The backrest assembly 152 can include a backrest frame 162 pivotally connected with the seat portion 150, two side bar linkages 164 respectively mounted with the backrest frame 162 and the seat portion 150, and springs 165 respectively connected between the side bar linkages 164 and the backrest frame 162. More specifically, the backrest frame 162 can include two side segments 162A, and a transverse segment 162B connected between the two side segments 162A. Each of the side segments 162A can have a distal end pivotally connected with a rear of the seat board 154. A first end portion 164A of each side bar linkage 164 can be pivotally connected with a corresponding side of the seat portion 150, e.g., with the link bracket 158. In one embodiment, the link bracket 158 can be pivotally connected with the seat board 154 and the first end portion 164A of the bar linkage 164 about two spaced-apart and parallel pivot axes. A second end portion 164B of the side bar linkage 164 opposite to the first end portion 164A can be connected with the corresponding side segment 162A of the backrest frame 162 via a coupling element 166.

The coupling elements 166 can be designed to hold the backrest frame 162 in two different angular positions relative to the seat portion 150. In one embodiment, each of the coupling elements 166 can include a tubular section 166A through which the second end portion 164B of the associated bar linkage 164 can be affixed. The coupling element 166 can also include an extension 166B through which is defined a guide slot 168. The guide slot 168 can include a first stop region 168A, a second stop region 168B, and a sharp turn 168C between the first and second stop regions 168A and 168B. Each of the side segments 162A can have a protruding stud 170 that can be movably mounted through the guide slot 168 of one associated coupling element 166. In one embodiment, the stud 170 may be located closer to a top of the backrest frame 162 (i.e., approximately corresponding to the transverse segment 162B) than the distal end of the side segment 162A.

Each of the springs 165 can have a first end connected with the second end portion 164B of the side bar linkage 164, and a second end connected with the side segment 162A of the backrest frame 162 at a position below the second end portion 164B. The biasing action applied by the springs 165 can position the studs 170 in either of the first and second stop regions 168A and 168B for holding the backrest assembly 152 at a desired angular position.

Figure 4:
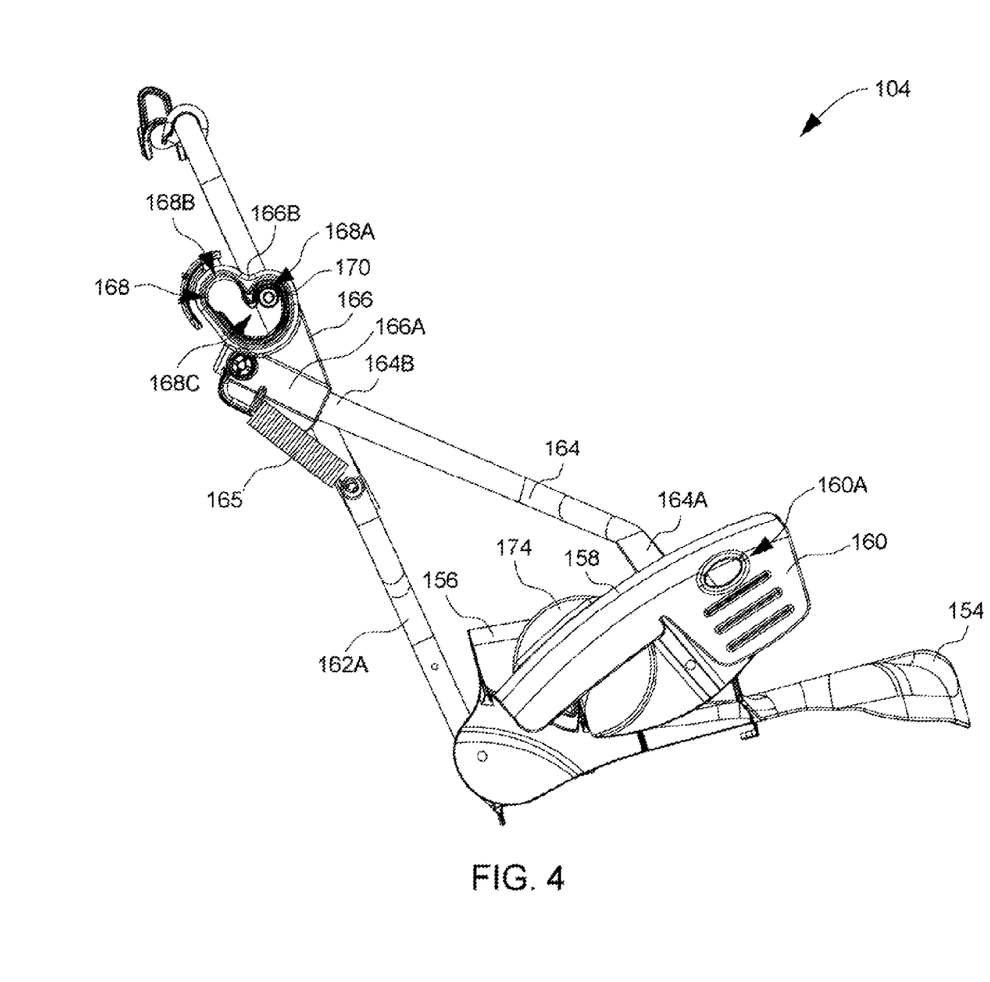
FIG. 4 is a schematic side view illustrating the first seat provided with a backrest assembly in a first angular position.
Figure 5:
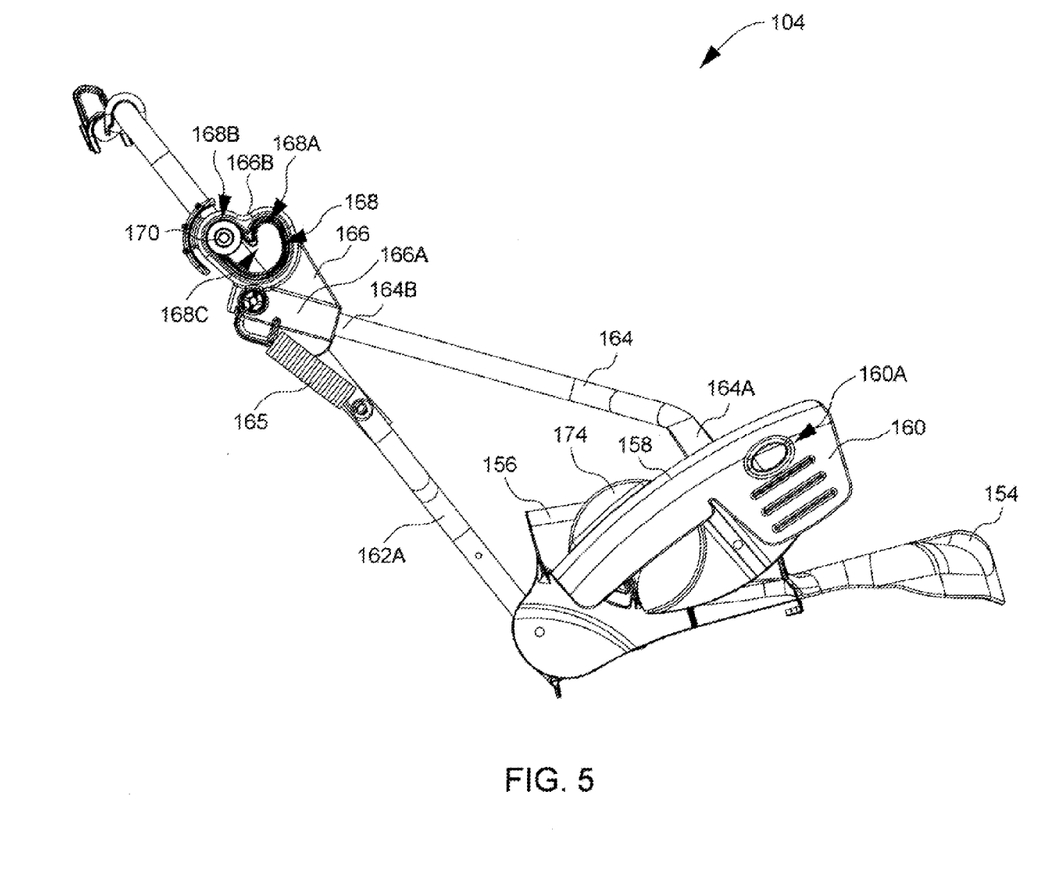
FIG. 5 is a schematic side view illustrating the backrest assembly of the first seat adjusted to a second angular position.

FIGS. 4 and 5 are schematic side views illustrating adjustment of the backrest assembly 152 to different angular positions. In FIG. 4, under the biasing action of the springs 165, each of the studs 170 can be restrainedly positioned in the first stop region 168A of the associated coupling element 166 so that the backrest frame 162 can be held in a first angular position relative to the seat portion 150.

To recline the backrest assembly 152, the side bar linkages 164 can be pulled upward to drive upward displacement of the coupling elements 166. As a result, the springs 165 can be stretched, and the studs 170 can disengage from the first stop regions 168A. Once the studs 170 have respectively engaged in the turns 168C of the guide slots 168, the side bar linkages 164 can be released, and the biasing action of the springs 165 can cause relative movements between the side bar linkages 164 and the backrest frame 162 that result in the studs 170 engaging the second stop regions 168B. Accordingly, the backrest frame 162 can be held in the second angular position, as shown in FIG. 5.

Figure 6:
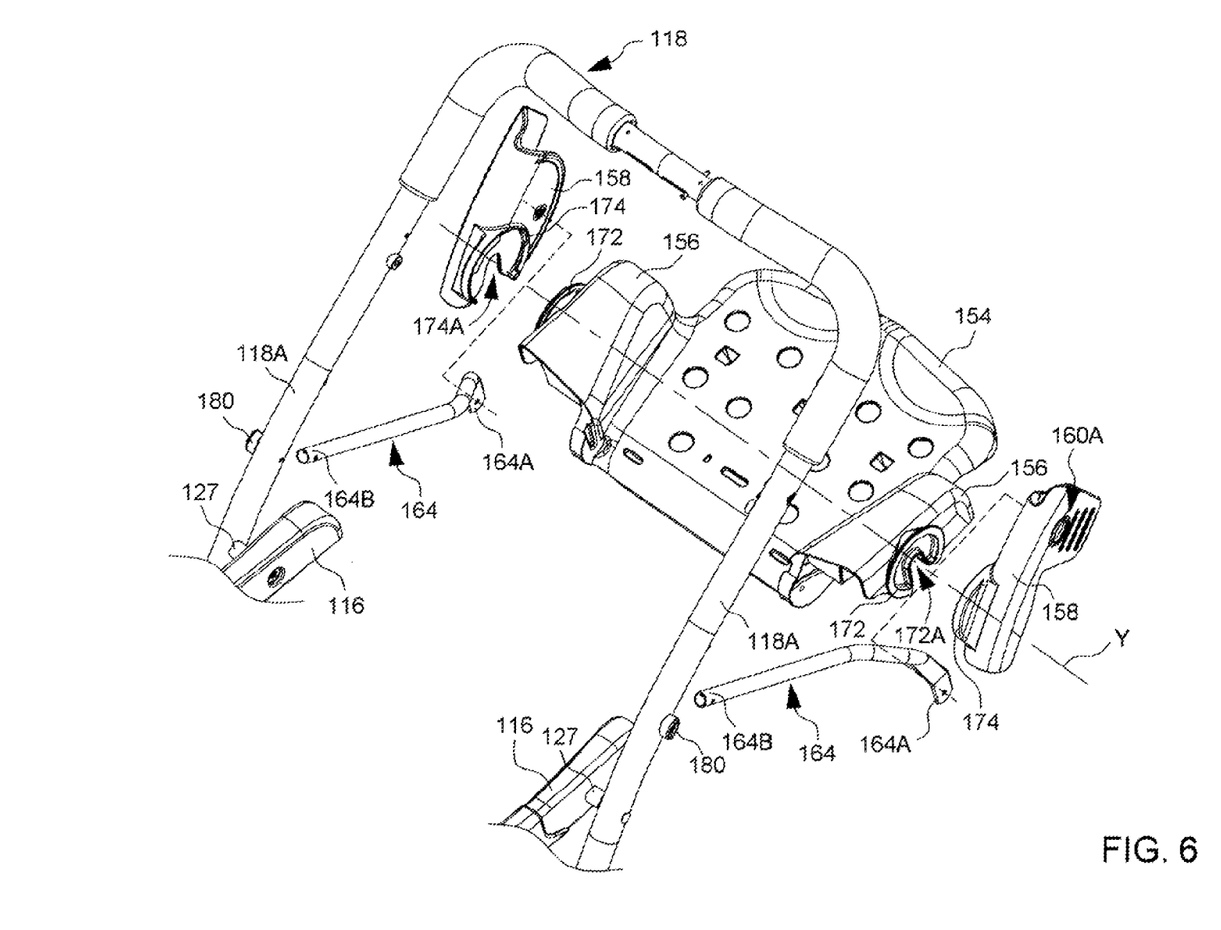
FIG. 6 is an exploded view illustrating the assembly of the link brackets with the seat board, the side handrails and the handle.

In conjunction with FIG. 2, FIG. 6 is an exploded view illustrating the assembly of the link brackets 158 with the seat board 154, the side handrails 116 and the handle 118. As shown in FIG. 2, the first seat 104 can be assembled at the rear of the support frame 102 substantially adjacent to the side handrails 116. More specifically, the first seat 104 can be placed such that the lateral extensions 156 respectively rest in contact against upper surfaces of the side handrails 116. In one embodiment, each of the lateral extensions 156 can define a pocket structure that can receive and wrap around a rear portion of the side handrail 116, such that the first seat 104 can be securely supported by the side handrails 116.

Moreover, as shown in FIG. 6, each of the lateral extensions 156 of the seat board 154 can have an outer side surface formed with a joint plate 172 of a generally circular shape. The joint plate 172 can include an elongated slot 172A extending in a radial direction. A side of each link bracket 158 facing the joint plate 172 can also be formed with a correspondingly mating joint plate 174 of a generally circular shape. Likewise, the joint plate 174 can include an elongated slot 174A extending in a radial direction. The joint plates 172 and 174 can be assembled together to pivotally connect each link bracket 158 with the corresponding outer side (i.e., left and right outer side) of the lateral extensions 156. When the first seat 104 is mounted with the support frame 102, each of the left and right pivotal connections formed by the assembly of the paired joint plates 172 and 174 can be placed in a gap delimited between the side handrail 116 and the associated side segment 118A of the handle 118. More specifically, the slots 172A and 174A can be aligned with each other, so that the shaft portion 127 that connects the side handrail 116 with the side segment 118A can be inserted into the slots 172A and 174A until it reaches the position of a rotation axis Y of the pivotal connection defined by the assembly of the joint plates 172 and 174. The placement of the shaft portion 127 through the slots 172A and 174A can help to restrainedly position the seat board 154 relative to the side handrails 116. In addition, the position of the shaft portion 127 on the rotation axis Y can allow rotation of the link bracket 158 relative to the seat board 154 and the shaft portion 127. As they are being mounted, the link brackets 158 can respectively wrap around portions of the handle side segments 118A, and latches 180 (e.g., formed as studs protruding from the side segments 118A) can respectively engage through the openings 160A to anchor the link brackets 158 with the handle 118. It is worth noting that alternate embodiments may also provide a latch 180 formed as an opening, and the flex tongue 160 can include a stud that can likewise engage with the latch 180 to lock the link bracket 158 with the handle 118. In this manner, the first seat 104 can be securely attached in place via the connections between the lateral extensions 156 and the side handrails 116, and the connections between the link brackets 158 and the handle 118.

Referring again to FIG. 2, when the first seat 104 is installed for use, a strap 184 may be attached between the seat board 154 and an upper transverse element lying between the side segments 118A of the handle 118, such as the tray 131. When a child is placed on the first seat 104, the strap 174 may be used as a crotch strap that can restrain movements of the child and prevent the occurrence of accidental falls.

To remove the first seat 104, the flex extensions 160 can be deflected until the latches 180 disengage from the openings 160A. The first seat 104 then can be pulled upward, which causes the lateral extensions 156 and the link brackets 158 to respectively disengage from the side handrails 116 and the side segments 118A of the handle 118, and the shaft portions 127 to disengage from the slots 172A and 174A on the left and right sides of the support frame 102. As a result, the first seat 104 can be easily removed from the support frame 102.

With the above construction, each of the first and second seats 104 and 106 can be easily installed and removed from the support frame 102. Accordingly, the configuration of the stroller apparatus 100 can be quickly modified according to the desired use needs.

Figure 7:
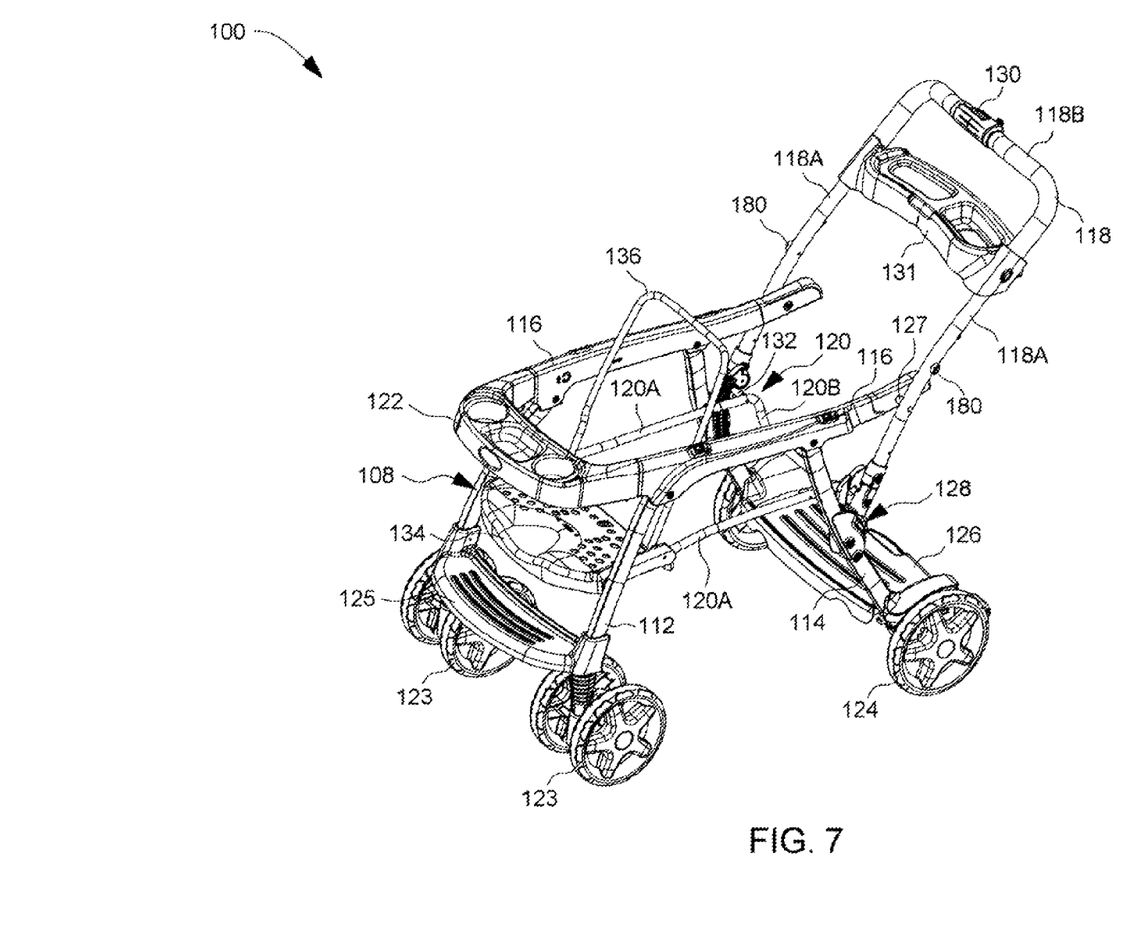
FIG. 7 a schematic view illustrating a first use configuration of the stroller apparatus in which the first and second seats are removed from the support frame.
Figure 8:
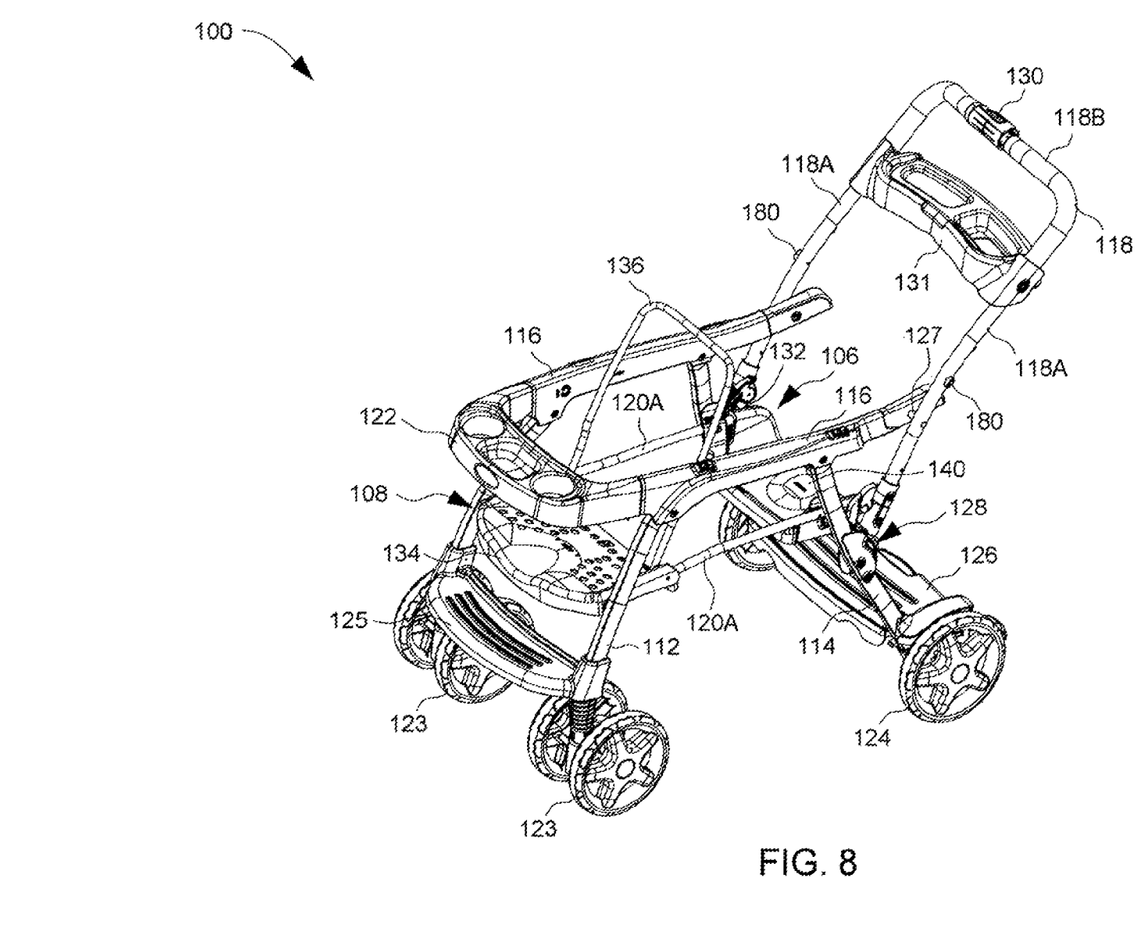
FIG. 8 is a schematic view illustrating a second use configuration of the stroller apparatus in which the first seat is removed and the second seat is assembled with the support frame.
Figure 9:
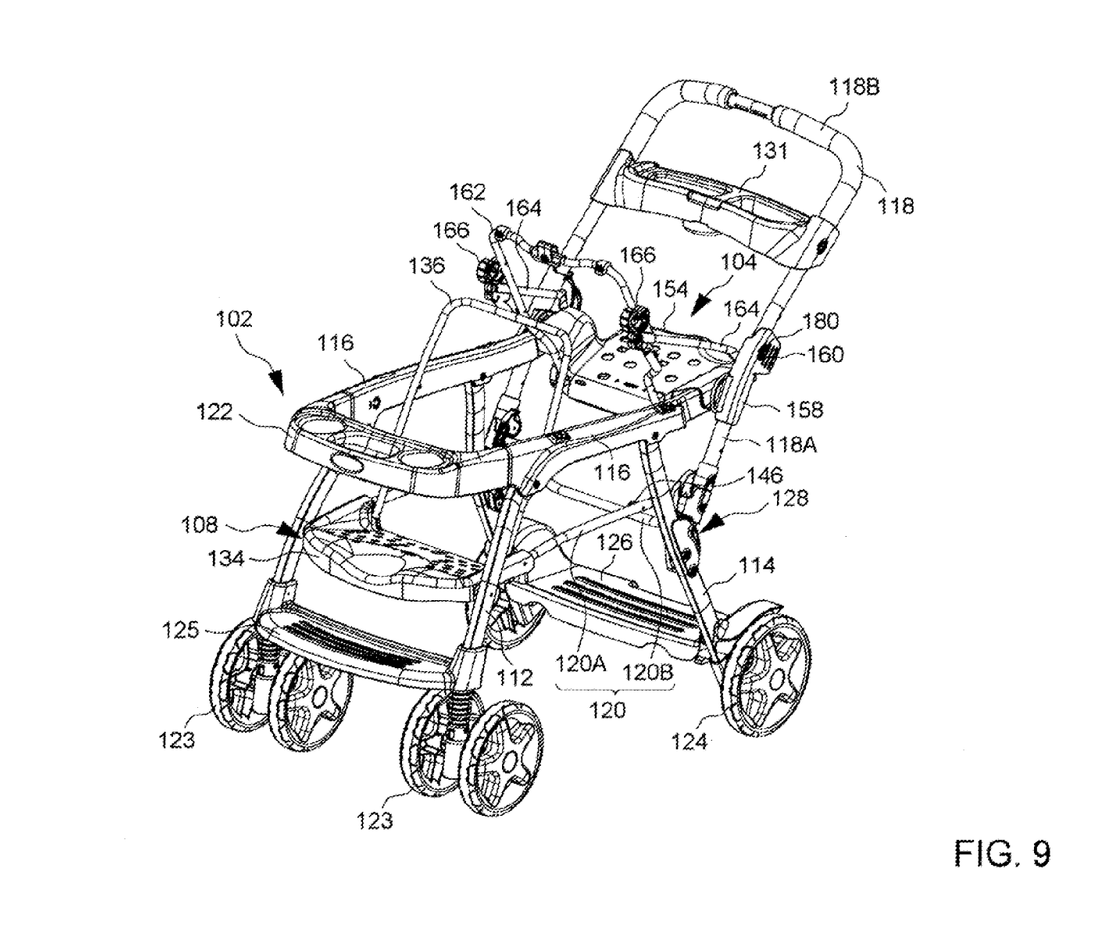
FIG. 9 is a schematic view illustrating a third use configuration of the stroller apparatus in which the second seat is removed and the first seat is assembled with the support frame.

FIGS. 7-9 are schematic views illustrating various use configurations of the stroller apparatus 100. In FIG. 7, both the first and second seats 104 and 106 are removed from the support frame 102. In this configuration, a first child can be placed in the third seat 108 facing forward, and a second child can be standing on the stand platform 126.

In FIG. 8, the first seat 104 is removed from the stroller apparatus 100, whereas the second seat 106 is assembled with the support frame 102. In this configuration, a first child can be installed on the third seat 108 facing forward, and a second child can be installed on the second seat 106 facing rearward behind the first child. While seating on the second seat 106, the stand platform 126 can provide support for placement of the child's feet. Accordingly, the stroller apparatus 100 can be used as a tandem stroller to transport at least two children.

In FIG. 9, the second seat 106 is removed from the stroller apparatus 100, whereas the first seat 104 is assembled with the support frame 102. In this configuration, a first child can be placed in the third seat 108 facing forward, and a second child can be installed on the first seat 104 facing rearward behind the first child. As the first seat 104 is located at a position elevated relative to the third seat 108, the second child can be seated higher than the first child and closer to the caregiver at the rear of the stroller apparatus 100. Accordingly, the first seat 104 may be particularly suitable for receiving a young child that may need continuous care from the caregiver.

Figure 10:
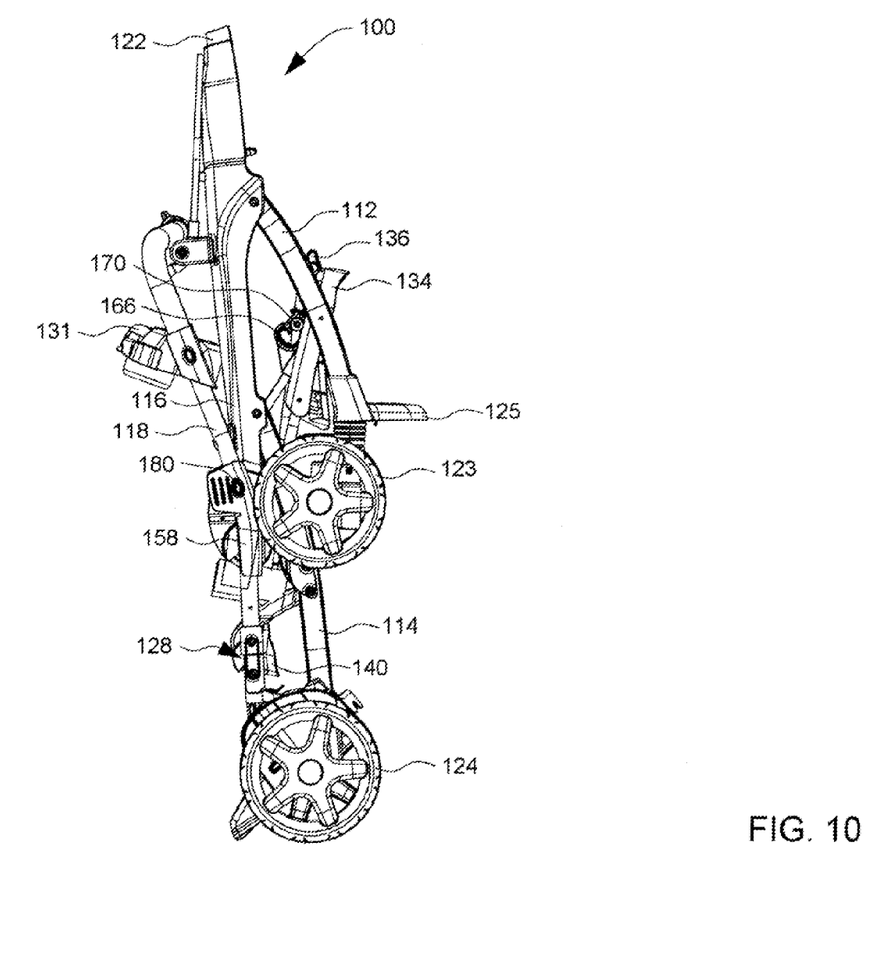
FIG. 10 is a schematic view illustrating the stroller apparatus in a collapsed state.

FIG. 10 is a schematic view illustrating the stroller apparatus 100 in a collapsed state. The stroller apparatus 100 provided with the first, second and third seats 104, 106 and 108 can be conveniently collapsed without requiring any seat disassembly. To fold the stroller apparatus 100, the handle 118 can be rotated forward relative to the side handrails 116.

As a result, the link brackets 158 can rotate with the handle 118 about the shaft portions 127 relative to the seat board 154 to drive movement of the side bar linkages 164 in a direction that has the studs 170 shifted from the first stop regions 168A to the second stop regions 168B. The backrest frame 162 of the first seat 104 thus can self adjust to the reclined position to facilitate the collapse of the stroller apparatus 100.

As it is rotated forward, the handle 118 can also move relative to the rear legs 114, and drive rearward folding of the rear legs 114 relative to the side handrails 116 as well as rearward displacement of the seat support frame 120 via the joint structures 128. In turn, the seat support frame 120 can drive the front legs 112 to fold rearward relative to the side handrails 116. Accordingly, the stroller apparatus 100 can be conveniently collapsed as shown in FIG. 10, without the need of removing the first and second seats 104 and 106.

As described above, the first and second seats 104 and 106 can permit to seat children of different ages at different heights. A younger child can be installed at a higher position on the first seat 104, whereas an older child can be seated at a lower position on the second seat 106. Because the first and second seats 104 and 106 can be placed substantially adjacent to the handle 118, the child can be seated closer to the caregiver to facilitate care dispensing and interaction. While the aforementioned embodiments have provided some constructions to attach the first and second seats 104 and 106, other structures may also be applicable.

Figure 11:
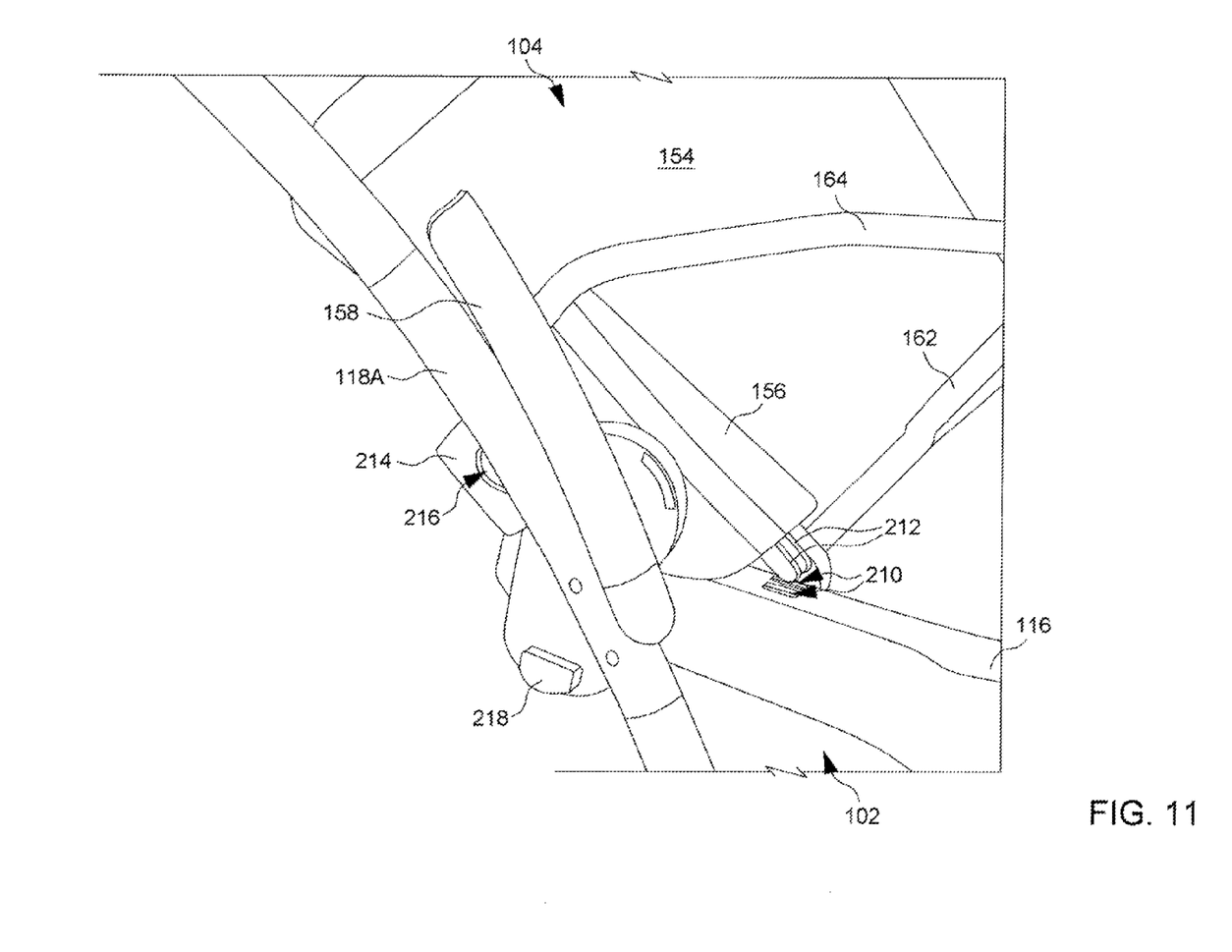
FIG. 11 is a schematic view illustrating a variant embodiment for attaching the first seat with the support frame of the stroller apparatus.

FIG. 11 is a schematic view illustrating a variant embodiment for attaching the first seat 104 with the support frame 102. In this embodiment, the upper surface of each side handrail 116 can include an alignment structure comprised of one or more restricting slits 210 through which one or more tabs 212 protruding from a rear of the lateral extension 156 can insert to properly position the first seat 104 relative to the side handrails 116. Moreover, the seat board 154 can have a flex tongue 214 provided with an opening 216 through which a latch 218 provided on a side surface of the side handrail 116 can engage. In one embodiment, the latch 218 can be formed as a protruding stud.

During installation, the first seat 104 can be placed at an inclined position such that the tabs 212 can be inserted through the restricting slits 210 to form a hinge connection. The first seat 104 then can be rotated about this hinge connection until the seat board 154 comes into locking engagement with the latch 218, achieved by engagement of the latch 218 through the opening 216 of the flex tongue 214. As the first seat 104 rotates, the link brackets 158 can self position with the side segments 118A of the handle 118.

It is noted that because the first seat 104 can be locked in place with the latch 218, the construction of the latches 180 on the handle 118 and the openings 160A on the link brackets 158 (as shown in FIG. 2) may be omitted.

At least one advantage of the structures described herein is the ability to use different detachable seats to place children of different ages at rearward positions substantially close to the caregiver. Accordingly, care dispensing and interaction with the child can be facilitated.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A stroller apparatus comprising:
   a support frame including a side handrail that extends from a front toward a rear of the stroller apparatus;
   a first seat assembled with the support frame adjacent to the side handrail and configured to receive a child in a first position, the first seat resting in contact with the side handrail and being at least partially supported by the side handrail;
   a second seat assembled with the support frame below the side handrail and configured to receive the child in a second position at a height different from the first position, the child facing rearward when seated on either of the first and second seats; and
   a third seat assembled with the support frame and configured to receive a second child in a third position facing forward in front of the first and second seats.

2. The stroller apparatus according to claim 1, wherein the first and second seats are detachably assembled with the support frame.

3. The stroller apparatus according to claim 1, wherein the support frame further includes a handle that is pivotally connected with the side handrail.

4. The stroller apparatus according to claim 1, wherein the first seat has a lateral extension adapted to rest in contact against an upper surface of the side handrail when the first seat is installed on the support frame.

5. The stroller apparatus according to claim 1, wherein the support frame further comprises a seat support frame below the side handrail, one of the seat support frame and the second seat comprises a stud and the other one of the seat support frame and the second seat comprises an opening for engaging the stud.

6. The stroller apparatus according to claim 1, wherein the first seat comprises:
   a seat portion; and
   a backrest assembly connected with the seat portion, the backrest assembly including:
      a backrest frame pivotally connected with the seat portion and extending upward from the seat portion;
      a side bar linkage having a first end portion and a second end portion, the first end portion being pivotally connected with the seat portion; and
      a coupling element connecting the second end portion of the side bar linkage with the backrest frame, the assembly of the side bar linkage and the coupling element being configured to hold the backrest frame in any of a first and a second angular positions relative to the seat portion.

7. The stroller apparatus according to claim 1, further comprising a stand platform mounted with the support frame below the first and second seats.

8. The stroller apparatus according to claim 1, wherein the support frame further includes a handle comprising a transverse element, and the first seat is assembled facing the transverse element and includes a crotch strap that is operable to attach with the transverse element.

9. The stroller apparatus according to claim 4, wherein the upper surface of the side handrail has a restricting slit, and a rear of the lateral extension includes a tab adapted to engage through the restricting slit to form a hinge connection about which the first seat is rotated during installation on the support frame.

10. The stroller apparatus according to claim 9, wherein the side handrail further has a side surface provided with a latch, and the first seat is operable to rotate about the hinge connection until the first seat comes into locking engagement with the latch.

11. The stroller apparatus according to claim 6, wherein the backrest frame includes a protruding stud, and the coupling element is affixed with the second end portion and defines a guide slot through which the stud is movably mounted, the guide slot having a first stop region in which the stud is restrainedly positioned to hold the backrest frame in the first angular position, and a second stop region in which the stud is restrainedly positioned to hold the backrest frame in the second angular position.

12. The stroller apparatus according to claim 11, wherein a spring is connected between the coupling element and the backrest frame to drive engagement of the stud with either of the first and second stop regions.

13. The stroller apparatus according to claim 11, wherein the support frame further includes a handle, and the seat portion includes:
   a seat board; and
   a link bracket respectively pivotally connected with a side of the seat board and the first end portion of the side bar linkage;
   the link bracket being operable to rotate with the handle to cause the side bar linkage to move in a direction that has the stud shifted from the first stop region to the second stop region when the support frame is collapsed.

14. The stroller apparatus according to claim 13, wherein the handle includes a latch configured to lock the link bracket in place.

15. A stroller apparatus comprising:
   a support frame including a side handrail that extends from a front toward a rear of the infant carrier apparatus, and a seat support frame below the side handrail;
   a first seat detachably assembled with the support frame adjacent to the side handrail and configured to receive a child in a first position, the first seat having a lateral extension adapted to rest in contact against an upper surface of the side handrail when the first seat is installed on the support frame, whereby the first seat is at least partially supported by the side handrail;
   a second seat assembled with the seat support frame and configured to receive the child in a second position at a height different from the first position, the child facing rearward when seated on either of the first and second seats; and
   a third seat assembled with the seat support frame and configured to receive a second child in a third position facing forward in front of the first and second seats.

16. The stroller apparatus according to claim 15, wherein the upper surface of the side handrail has a restricting slit, and a rear of the lateral extension includes a tab adapted to engage through the restricting slit to form a hinge connection about which the first seat is rotated during installation on the support frame.

17. The stroller apparatus according to claim 15, wherein one of the seat support frame and the second seat comprises a stud, and the other one of the seat support frame and the second seat comprises an opening for engaging the stud.

18. The stroller apparatus according to claim 15, wherein the first seat includes:
   a seat portion; and
   a backrest assembly connected with the seat portion, the backrest assembly including:
      a backrest frame pivotally connected with the seat portion and extending upward from the seat portion;
      a side bar linkage having a first end portion and a second end portion, the first end portion being pivotally connected with the seat portion; and
      a coupling element connecting the second end portion of the side bar linkage with the backrest frame, the coupling element having a first and a second region;
      wherein the side bar linkage is adjustable so that the second end portion is connected with the backrest frame at either of the first and second region, the side bar linkage holding the backrest frame in a first angular position relative to the seat portion when the second end portion is connected with the backrest frame at the first region, and the side bar linkage holding the backrest frame in a second angular position relative to the seat portion when the second end portion is connected with the backrest frame at the second region.

19. The stroller apparatus according to claim 16, wherein the side handrail further has a side surface provided with a latch, and the first seat is operable to rotate about the hinge connection until the first seat comes into locking engagement with the latch.

20. The stroller apparatus according to claim 18, wherein the backrest frame includes a protruding stud, and the coupling element is affixed with the second end portion and defines a guide slot through which the stud is movably mounted, the guide slot connecting with the first and second regions, the stud being restrainedly positioned in the first region to hold the backrest frame in the first angular position, and the stud being restrainedly positioned in the second region to hold the backrest frame in the second angular position.

21. The stroller apparatus according to claim 20, wherein a spring is connected between the coupling element and the backrest frame to drive engagement of the stud with either of the first and second regions.

22. The stroller apparatus according to claim 20, wherein the support frame further includes a handle, and the seat portion includes:
   a seat board; and
   a link bracket respectively pivotally connected with a side of the seat board and the first end portion of the side bar linkage;
   the link bracket being operable to rotate with the handle to cause the side bar linkage to move in a direction that has the stud shifted from the first region to the second region when the support frame is collapsed.

23. The stroller apparatus according to claim 22, wherein the handle includes a latch configured to lock the link bracket in place.

* * * * *